US012682822B2

(12) United States Patent
Zhou et al.

(10) Patent No.: US 12,682,822 B2
(45) Date of Patent: Jul. 14, 2026

(54) GOA CIRCUIT AND DISPLAY PANEL

(71) Applicant: Shenzhen China Star Optoelectronics Semiconductor Display Technology Co., Ltd., Shenzhen (CN)

(72) Inventors: Xiang Zhou, Shenzhen (CN); Baixiang Han, Shenzhen (CN); Guangyao Li, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/089,830

(22) Filed: Mar. 25, 2025

(65) Prior Publication Data

US 2025/0299616 A1 Sep. 25, 2025

(30) Foreign Application Priority Data

Mar. 25, 2024 (CN) ......................... 202410358608.5

(51) Int. Cl.
*G09G 3/20* (2006.01)
*G09G 3/3208* (2016.01)
*G09G 3/36* (2006.01)

(52) U.S. Cl.
CPC ............. *G09G 3/2092* (2013.01); *G09G 3/20* (2013.01); *G09G 3/3208* (2013.01); *G09G 3/3677* (2013.01); *G09G 2310/0267* (2013.01)

(58) Field of Classification Search
CPC ...... G09G 3/20; G09G 3/2092; G09G 3/3208; G09G 3/3677; G09G 2310/0267
USPC .......................................................... 345/55
See application file for complete search history.

(56) References Cited

U.S. PATENT DOCUMENTS

| | | | | |
|---|---|---|---|---|
| 11,521,566 | B2 * | 12/2022 | Liao | G09G 3/3677 |
| 11,769,455 | B2 * | 9/2023 | Feng | G09G 3/3266<br>345/214 |
| 12,277,882 | B1 * | 4/2025 | Zhou | G09G 3/3677 |
| 2017/0032733 | A1 * | 2/2017 | Jang | G09G 3/20 |
| 2018/0284551 | A1 * | 10/2018 | Shim | G02F 1/136286 |
| 2022/0114967 | A1 * | 4/2022 | Xue | G09G 3/3266 |
| 2022/0208082 | A1 * | 6/2022 | Ban | G09G 3/3258 |
| 2023/0036780 | A1 * | 2/2023 | Lu | G09G 3/3655 |
| 2025/0239210 | A1 * | 7/2025 | Jang | G09G 3/32 |

* cited by examiner

*Primary Examiner* — Jason M Mandeville
(74) *Attorney, Agent, or Firm* — PV IP PC; Peter Stecher; Wei Te Chung

(57) ABSTRACT

The present disclosure relates to a GOA circuit and a display panel. The GOA circuit includes a plurality of cascaded GOA units, wherein each GOA unit includes a pull-up module, an inverter module, a pull-down module, and an output module. The pull-up module includes a first thin-film transistor and a second thin-film transistor. The first thin-film transistor is connected to a pull-up signal. The second thin-film transistor is connected to a pull-down node. The inverter module includes a seventh thin-film transistor. The seventh thin-film transistor is connected to a pull-up node. The pull-down module includes an eighth thin-film transistor and a ninth thin-film transistor. The eighth thin-film transistor and the ninth thin-film transistor are respectively connected to the pull-down node. In the output module, the gate of each thin-film transistor is connected to the pull-up node.

10 Claims, 2 Drawing Sheets

GOA CIRCUIT AND DISPLAY PANEL

CROSS-REFERENCE TO RELATED DISCLOSURE

The present disclosure claims priority to Chinese Patent Application No. 202410358608.5, filed on Mar. 25, 2024, the content of which is incorporated herein by reference in its entirety.

TECHNICAL FIELD

The present disclosure relates to the field of display technologies.

BACKGROUND

The structures of Gate Driver on Array (GOA) circuits in the prior art are complex. A specific structure thereof can be referred to as shown in FIG. 1, and will not be further elaborated here. Thin-film transistors on the leakage-current path between a first low-potential signal and a pull-up node will affect leakage current at a pull-up node. As shown in FIGS. 1, T43, T44, T41, T42, T11, and T12 are all thin-film transistors on leakage-current paths of a pull-up node, resulting in a relative large number of leakage-current paths of the pull-up node, which easily result in relatively serious leakage-current problems at the pull-up node. Furthermore, the leakage current at the pull-up node will affect output waveform, causing the peak value of the output waveform to be not high enough, or even unable to be output.

Therefore, the GOA circuits in the prior art have technical problems of serious leakage-current at a pull-up node.

SUMMARY

A GOA circuit according to one or more embodiments of the present disclosure includes a plurality of cascaded GOA units, wherein each GOA unit includes a pull-up module, an inverter module, a pull-down module, and an output module. The pull-up module includes a first thin-film transistor and a second thin-film transistor, wherein a gate of the first thin-film transistor is connected to a pull-up signal, one terminal of the first thin-film transistor is connected to a pull-down node, the other terminal of the first thin-film transistor is connected to a first low-potential signal, a gate of the second thin-film transistor is connected to a first node, one terminal of the second thin-film transistor is connected to a high-potential signal, and the other terminal of the second thin-film transistors is connected to the pull-down node. The inverter module includes a seventh thin-film transistor, wherein a gate of the seventh thin-film transistor is connected to a second node, one terminal of the seventh thin-film transistor is connected to the high-potential signal, the other terminal of the seventh thin-film transistor is connected to a pull-up node. The pull-down module includes an eighth thin-film transistor and a ninth thin-film transistor, wherein a gate of the eighth thin-film transistor and a gate of the ninth thin-film transistor are respectively connected to the pull-down node, one terminal of the eighth thin-film transistor is connected to the first low-potential signal, the other terminal of the eighth thin-film transistor is connected to one terminal of the ninth thin-film transistor, and the other terminal of the ninth thin-film transistor is connected to the pull-up node. In the output module the gate of each thin-film transistor is connected to the pull-up node. Wherein, in a pull-up stage, the first thin-film transistor is turned on, the second thin-film transistor is turned off, the seventh thin-film transistor is turned on, the eighth thin-film transistor and the ninth thin-film transistor are turned off, the pull-up node is connected to the high-potential signal, and the pull-down node is connected to the first low-potential signal. In a pull-down stage, the first thin-film transistor is turned off, the second thin-film transistor is turned on, the seventh thin-film transistor is turned off, the eighth thin-film transistor and the ninth thin-film transistor are turned on, the pull-down node is connected to the high-potential signal, and the pull-up node is connected to the first low-potential signal.

A display panel according to one or more embodiments of the present disclosure includes a GOA circuit, the GOA circuit includes a plurality of cascaded GOA units, wherein each GOA unit includes a pull-up module, an inverter module, a pull-down module, and an output module. The pull-up module includes a first thin-film transistor and a second thin-film transistor, wherein a gate of the first thin-film transistor is connected to a pull-up signal, one terminal of the first thin-film transistor is connected to a pull-down node, the other terminal of the first thin-film transistor is connected to a first low-potential signal, a gate of the second thin-film transistor is connected to a first node, one terminal of the second thin-film transistor is connected to a high-potential signal, and the other terminal of the second thin-film transistors is connected to the pull-down node. The inverter module includes a seventh thin-film transistor, wherein a gate of the seventh thin-film transistor is connected to a second node, one terminal of the seventh thin-film transistor is connected to the high-potential signal, the other terminal of the seventh thin-film transistor is connected to a pull-up node. The pull-down module includes an eighth thin-film transistor and a ninth thin-film transistor, wherein a gate of the eighth thin-film transistor and a gate of the ninth thin-film transistor are respectively connected to the pull-down node, one terminal of the eighth thin-film transistor is connected to the first low-potential signal, the other terminal of the eighth thin-film transistor is connected to one terminal of the ninth thin-film transistor, and the other terminal of the ninth thin-film transistor is connected to the pull-up node connection. In the output module the gate of each thin-film transistor is connected to the pull-up node. Wherein, in a pull-up stage, the first thin-film transistor is turned on, the second thin-film transistor is turned off, the seventh thin-film transistor is turned on, the eighth thin-film transistor and the ninth thin-film transistor are turned off, the pull-up node is connected to the high-potential signal, and the pull-down node is connected to the first low-potential signal. In a pull-down stage, the first thin-film transistor is turned off, the second thin-film transistor is turned on, the seventh thin-film transistor is turned off, the eighth thin-film transistor and the ninth thin-film transistor are turned on, the pull-down node is connected to the high-potential signal, and the pull-up node is connected to the first low-potential signal.

LIST OF REFERENCE SIGNS IN THE DRAWINGS

10, GOA unit; 1, pull-up module; 2, inverter module; 3, pull-down module; 4, output module; 5, leakage-current prevention module; 6, pull-up stage; 7, output stage; 8, pull-down stage; 9, pull-down maintenance stage; CKa, first pulse signal; CKb, second pulse signal; WR, output terminal of scan signal; Cout, output terminal of cascade transmission signal; VGL1, first low-potential signal; VGL2, second low-potential signal; VGH, high-potential signal; Cout-PU, pull-up signal; Cout-PD, pull-down signal; Q, pull-up node; QB, pull-down node; M, first node; N, second node; T1, first thin-film transistor; T2, second thin-film transistor; T3, third thin-film transistor; T4, fourth thin-film transistor; T5, fifth thin-film transistor; T6, sixth thin-film transistor; T7, seventh thin-film transistor; T8, eighth thin-film transistor; T9, ninth thin-film transistor; T10, tenth thin-film transistor; T11, eleventh thin-film transistor; T12, twelfth thin-film transistor; T13, thirteenth thin-film transistor; C1, first capacitor; and C2, second capacitor.

DETAILED DESCRIPTION

The embodiments of the present disclosure only illustrate exemplary embodiments of concepts of the present disclosure, which may be implemented in many different forms and should not be construed as being limited to the embodiments herein.

The technical solutions in the embodiments of the present disclosure will be clearly and completely described below with reference to the accompanying drawings. It will be apparent that the described embodiments are only some of the embodiments of the present disclosure, but not all of the embodiments. Based on the embodiments in the present disclosure, all other embodiments obtained by the skilled person in the art without involving any creative labor are within the scope of the present disclosure. Furthermore, it should be understood that the specific embodiments described herein are only for the purpose of illustration and explanation of the disclosure, and are not intended to limit the present disclosure. In the present disclosure, unless otherwise specified, the directional words used such as “above” and “below” generally refer to directions of a device in its actual operation or working state, specifically as shown in the accompanying drawings; and “inside” and “outside” refer to the outline of the device.

Figure 2:
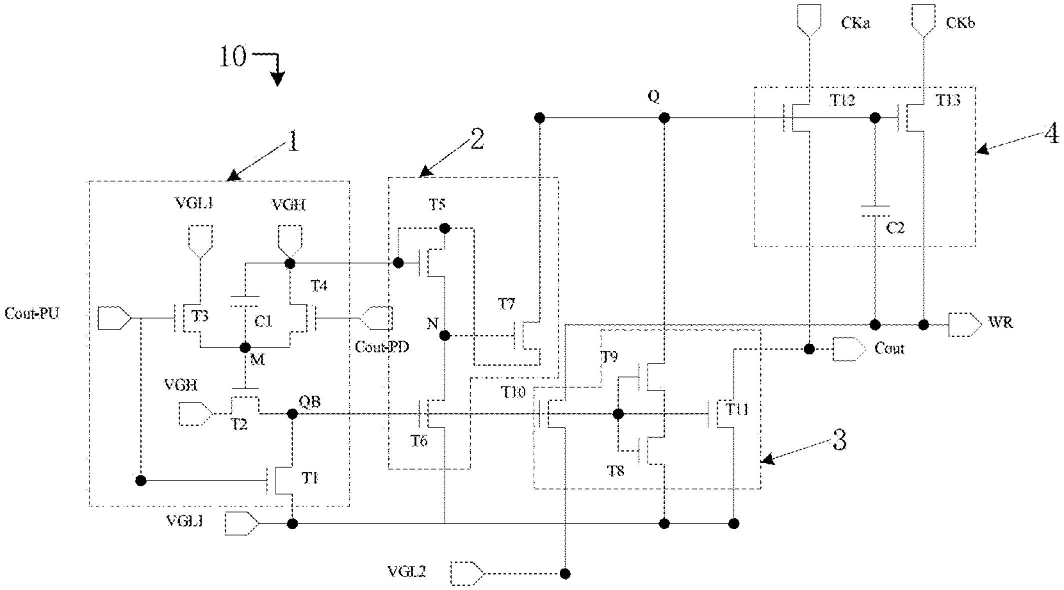
FIG. 2 is a schematic circuit diagram of a GOA unit in the GOA circuit according to one or more embodiments of the present disclosure.
Figure 3:
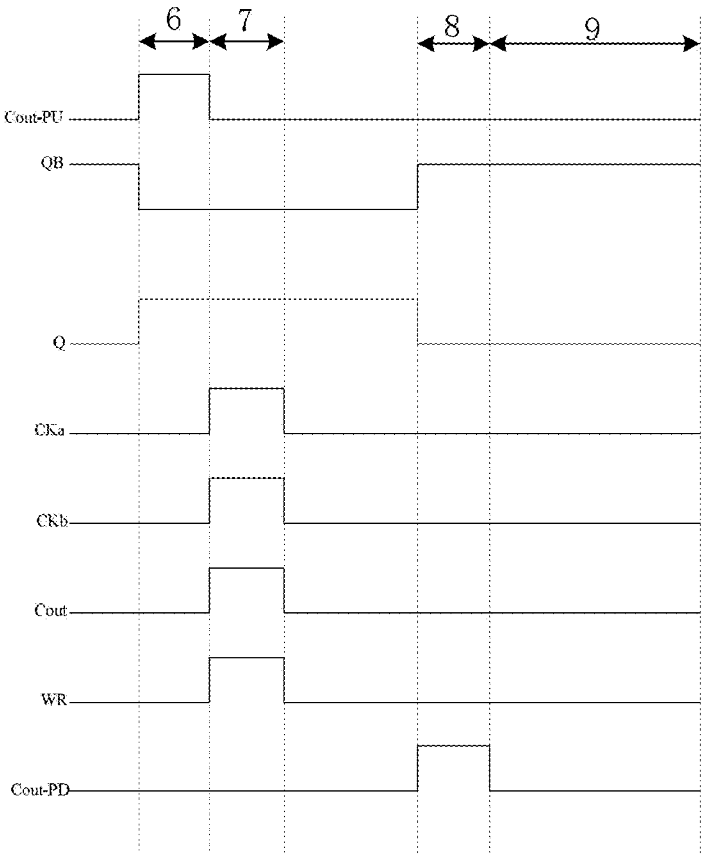
FIG. 3 is a sequence diagram of the operation of the GOA circuit according to one or more embodiments of the present disclosure.

As shown in FIG. 2, a GOA circuit according to one or more embodiments of the present disclosure includes a plurality of cascaded GOA units. Each GOA unit includes a pull-up module 1, an inverter module 2, a pull-down module 3, and an output module 4. The pull-up module 1 includes a first thin-film transistor T1 and a second thin-film transistor T2. A gate of the first thin-film transistor T1 is connected to a pull-up signal Cout-PU. One terminal of the first thin-film transistor T1 is connected to a pull-down node QB, and the other terminal of the first thin-film transistor T1 is connected to a first low-potential signal VGL1. A gate of the second thin-film transistor T2 is connected to a first node M. One terminal of the second thin-film transistor T2 is connected to a high-potential signal VGH, and the other terminal of the second thin-film transistor T2 is connected to the pull-down node QB. The inverter module 2 includes a seventh thin-film transistor T7. A gate of the seventh thin-film transistor T7 is connected to the second node N. One terminal of the seventh thin-film transistor T7 is connected to the high-potential signal VGH, and the other terminal of the seventh thin-film transistor T7 is connected to a pull-up node Q. The pull-down module 3 includes an eighth thin-film transistor T8 and a ninth thin-film transistor T9. A gate of the eighth thin-film transistor T8 and a gate of the ninth thin-film transistor T9 are respectively connected to the pull-down node QB. One terminal of the eighth thin-film transistor T8 is connected to the first low-potential signal VGL1. The other terminal of the eighth thin-film transistor T8 is connected to one terminal of the ninth thin-film transistor T9, and the other terminal of the ninth thin-film transistor T9 is connected to the pull-up node Q. The gate of each thin-film transistor in the output module 4 is connected to the pull-up node Q. As shown in FIG. 3, in a pull-up stage 6, the first thin-film transistor T1 is turned on, the second thin-film transistor T2 is turned off, the seventh thin-film transistor T7 is turned on, the eighth thin-film transistor T8 and the ninth thin-film transistor T9 are turned off, the pull-up node Q is connected to the high-potential signal VGH, and the pull-down node QB is connected to the first low-potential signal VGL1. In a pull-down stage 8, the first thin-film transistor T1 is turned off, the second thin-film transistor T2 is turned on, the seventh thin-film transistor T7 is turned off, the eighth thin-film transistor T8 and the ninth thin-film transistor T9 are turned on, the pull-down node QB is connected to the high-potential signal VGH, and the pull-up node Q is connected to the first low-potential signal VGL1.

In the embodiments of the present disclosure, leakage-current paths of the pull-up node Q of the GOA circuit are reduced to the seventh thin-film transistor T7, the eighth thin-film transistor T8, and the ninth thin-film transistor T9. Compared to GOA circuits in the prior art, the GOA circuit of the present disclosure has less leakage-current paths, thereby reducing the leakage current at the pull-up node Q, which helps maintain the high-potential of the pull-up node Q, avoid an abnormal output of waveform, and alleviate the technical problem of serious leakage current at the pull-up node Q in the GOA circuits in the prior art.

The technical solutions provided by the present disclosure will be described in conjunction with the accompanying drawings and some specific embodiments below.

The embodiments of the present disclosure are only illustrated using a GOA circuit of 13T2C (13 transistors and 2 capacitors) as an example, the same approach can be applied to other specific implementations having more or less thin-film transistors for reducing the leakage current at the pull-up node Q.

In addition, the type of thin-film transistors of the present disclosure can be N-type or P-type, according to specific requirements. The thin-film transistors can utilize at least one of oxide thin-film transistors, amorphous silicon thin-film transistors, and low-temperature polysilicon thin-film transistors. All of variations fall within the scope of protection of the present disclosure and will be omitted here.

It should be noted that in the pull-up stage 6, an output terminal of a scan signal WR outputs a second pulse signal CKb, and an output terminal of a cascade transmission signal Cout outputs a first pulse signal CKa. In the pull-down stage 8, the output terminal of the scan signal WR outputs a second low-potential signal VGL2, and the output terminal of the cascade transmission signal Cout outputs a first low-potential signal VGL1.

In some embodiments, the pull-up module 1 further includes a third thin-film transistor T3 and a fourth thin-film transistor T4. A gate of the third thin-film transistor T3 is connected to the pull-up signal Cout-PU. One terminal of the third thin-film transistor T3 is connected to the first node M, and the other terminal of the third thin-film transistor T3 is connected to the first low-potential signal VGL1. A gate of the fourth thin-film transistor T4 is connected to a pull-down signal Cout-PD. One terminal of the fourth thin-film transistor T4 is connected to the high-potential signal VGH, and the other terminal of the fourth thin-film transistor T4 is connected to the first node M.

It can be understood that by controlling the first node M to be at a high potential, the second thin-film transistor T2 can be turned on and the pull-down node QB is connected to the high-potential signal VGH, thereby turning on the eighth thin-film transistor T8 and the ninth thin-film transistor T9, so that the pull-up node Q is connected to the first low-potential signal VGL1, thereby realizing a pull-down function. Specifically, by applying the pull-down signal Cout-PD to the gate of the fourth thin-film transistor T4, the fourth thin-film transistor T4 is turned on, thereby raising the potential of the first node M to a high potential, subsequently turning on the second thin-film transistor T2.

It can be understood that by controlling the first node M to be at a low potential, the second thin-film transistor T2 can be turned off. Specifically, by applying the pull-up signal Cout-PU to the gate of the first thin-film transistor T1 and the gate of the third thin-film transistor T3, the first thin-film transistor T1 and the third thin-film transistor T3 are turned on respectively. The first low-potential signal VGL1 is connected to the first node M through the third thin-film transistor T3, so that the second thin-film transistor T2 is turned off. Moreover, the first low-potential signal VGL1 is connected to the pull-down node QB through the first thin-film transistor T1, so that the pull-down node QB is at a low potential and the sixth thin-film transistor T6 is turned off. The second node N is connected to the high-potential signal VGH, causing the seventh thin-film transistor T7 to turn on, so that the high-potential signal VGH is connected to the pull-up node Q, causing the pull-up node Q to be at a high potential.

In some embodiments, the pull-up module 1 further includes a first capacitor C1. One terminal of the first capacitor C1 is connected to the high-potential signal VGH, and the other terminal of the first capacitor C1 is connected with the first node M.

It can be understood that by providing the first capacitor C1, one terminal of the first capacitor C1 is connected to the high-potential signal VGH, and the other terminal of the first capacitor C1 is connected to the first node M. By charging the first capacitor C1, the first capacitor C1 is used to maintain the high potential of the first node M during the pull-down maintenance stage 9. Compared to the prior art where the high potential of the first node M is not maintained by a capacitor, the maintenance capability of the capacitor in the present disclosure is relatively high, which improves stability of the pull-down maintenance stage 9.

It can be understood that by maintaining the high potential of the first node M through the first capacitor C1, the high potential of the first node M can ensure the continuous turning-on of the second thin-film transistor T2, thereby causing the pull-down node QB to continuously receive the high-potential signal VGH. The high potential of the second node N can turn on the eighth thin-film transistor T8 and the ninth thin-film transistor T9, thereby causing the pull-up node Q continuously receive the first low-potential signal VGL1, thus realizing an operating state of the pull-down maintenance stage 9.

In some embodiments, the inverter module 2 further includes a fifth thin-film transistor T5 and a sixth thin-film transistor T6. A gate of the fifth thin-film transistor T5 is connected to the high-potential signal VGH. One terminal of the fifth thin-film transistor T5 is connected to the second node N, and the other terminal of the fifth thin-film transistor T5 is connected to the high-potential signal VGH. A gate of the sixth thin-film transistor T6 is connected to the pull-down node QB. One terminal of the sixth thin-film transistor T6 is connected to the first low-potential signal VGL1, and the other terminal of the sixth thin-film transistor T6 is connected to the second node N.

It can be understood that since the fifth thin-film transistor T5 is normally turned on, in the pull-up stage 6, the sixth thin-film transistor T6 is turned off, and the seventh thin-film transistor T7 is turned on only due to the connection to the high-potential signal VGH.

It should be noted that, as shown in FIG. 2, since the fifth thin-film transistor T5 is normally turned on, in the pull-down stage 8, due to the connection of the pull-down node QB to the high-potential signal VGH, the sixth thin-film transistor T6 is turned on, the first low-potential signal VGL1 is connected to the second node N through the sixth thin-film transistor T6, so that the second node N is simultaneously connected to the high-potential signal VGH and the first low-potential signal VGL1. Although the gate of the seventh thin-film transistor T7 is not only connected to the first low-potential signal VGL1, the potential of the gate of the seventh thin-film transistor T7 in this case is not sufficient to turn on the seventh thin-film transistor T7 due to the simultaneous connections to the first low-potential signal VGL1 and the high-potential signal VGH. Therefore, the seventh thin-film transistor T7 is turned off, the high-potential signal VGH cannot be connected to the pull-up node Q through the seventh thin-film transistor T7. In this case, since the pull-down node QB is at the high potential, the eighth thin-film transistor T8 and the ninth thin-film transistor T9 are turned on, the first low-potential signal VGL1 is connected to the pull-up node Q through the eighth thin-film transistor T8 and the ninth thin-film transistor T9.

In some embodiments, the pull-down module 3 further includes a tenth thin-film transistor T10 and an eleventh thin-film transistor T11. A gate of the tenth thin-film transistor T10 is connected to the pull-down node QB. One terminal of the tenth thin-film transistor T10 is connected to the second low-potential signal VGL2, and the other terminal of the tenth thin-film transistor T10 is connected to the output terminal of the scan signal WR. A gate of the eleventh thin-film transistor T11 is connected to the pull-down node QB. One terminal of the eleventh thin-film transistor T11 is connected to the first low-potential signal VGL1, and the other terminal of the eleventh thin-film transistor T11 is connected to the output terminal of the cascade transmission signal Cout.

It can be understood that the output of the second low-potential signal VGL2 is realized by turning on the tenth thin-film transistor T10, and the output of the first low-potential signal VGL1 is realized by turning on the eleventh thin-film transistor T11. Herein, the tenth thin-film transistor T10 and the eleventh thin-film transistor T11 are turned on to respectively maintain the first low-potential signal VGL1 and the second low-potential signal VGL2 outputting low potentials.

In some embodiments, the output module 4 includes a twelfth thin-film transistor T12, a thirteenth thin-film transistor T13, and a second capacitor C2. A gate of the twelfth thin-film transistor T12 is connected to the pull-up node Q. One terminal of the twelfth thin-film transistor T12 is connected to the output terminal of the cascade transmission signal Cout, and the other terminal of the twelfth thin-film transistor T12 is connected to the first pulse signal CKa. A gate of the thirteenth thin-film transistor T13 is connected to the pull-up node Q. One terminal of the thirteenth thin-film transistor T13 is connected to the output terminal of the scan signal WR, and the other terminal of the thirteenth thin-film transistor T13 is connected to the second pulse signal CKb. One terminal of the second capacitor C2 is connected to the gate of the thirteenth thin-film transistor T13, and the other terminal of the second capacitor C2 is connected to one terminal of the thirteenth thin-film transistor T13.

It can be understood that the output of the first pulse signal CKa is realized by turning on the twelfth thin-film transistor T12, and the output of the second pulse signal CKb is realized by turning on the thirteenth thin-film transistor T13. Herein, the twelfth thin-film transistor T12 and the thirteenth thin-film transistor T13 are turned on to respectively maintain outputs of the first pulse signal CKa and the second pulse signal CKb.

In some embodiments, as shown in FIG. 3, the operating stages of the GOA circuit include a pull-up stage 6, an output stage 7, a pull-down stage 8, and a pull-down maintenance stage 9. In the pull-up stage 6, the pull-up signal Cout-PU is at a high-potential, the pull-down signal Cout-PD is at a low-potential, the first thin-film transistor T1 and the third thin-film transistor T3 are turned on, the first node M is connected to the first low-potential signal VGL1, the second thin-film transistor T2 is turned off, the pull-down node QB is connected to the first low-potential signal VGL1, the sixth thin-film transistor T6 is turned off, the second node N is connected to the high-potential signal VGH, the seventh thin-film transistor T7 is turned on, and the pull-up node Q is connected to the high-potential signal VGH.

In some embodiments, as shown in FIG. 3, in the output stage 7, the pull-up node Q is connected to the high-potential signal VGH, the twelfth thin-film transistor T12 and the thirteenth thin-film transistor T13 are turned on, the twelfth thin-film transistor T12 is connected to the first pulse signal CKa and outputs the first pulse signal CKa, and the thirteenth thin-film transistor T13 is connected to the second pulse signal CKb and outputs the second pulse signal CKb.

In some embodiments, as shown in FIG. 3, in the pull-down stage 8, the pull-down signal Cout-PD is at a high-potential, the pull-up signal Cout-PU is at a low-potential, the fourth thin-film transistor T4 is turned on, the first node M is connected to the high-potential signal VGH, the second thin-film transistor T2 is turned on, the pull-down node QB is connected to the high-potential signal VGH. The sixth thin-film transistor T6 is turned on, the seventh thin-film transistor T7 is turned off. The eighth thin-film transistor T8, the ninth thin-film transistor T9, the tenth thin-film transistor T10 and the eleventh thin-film transistor T11 are turned on. The pull-up node Q is connected to the first low-potential signal VGL1. In the pull-down maintenance stage 9, the pull-down signal Cout-PD is at a low-potential, the pull-up signal Cout-PU is at a low-potential, and the pull-down node QB maintains at a high potential.

It can be understood that in the pull-down stage 8, the pull-down node QB is connected to the high-potential signal VGH, the tenth thin-film transistor T10 and the eleventh thin-film transistor T11 are turned on, the output terminal of the cascade transmission signal Cout is connected to the first low-potential signal VGL1, and the output terminal of the scan signal WR is connected to the second low-potential signal VGL2.

It can be understood that in the pull-down maintenance stage 9, the pull-down signal Cout-PD is at a low-potential, the fourth thin-film transistor T4 is turned off, and the first capacitor C1 maintains the first node M at a high potential, keeping the second thin-film transistor T2 turning on, thereby maintaining the connection of the pull-down node QB to the high-potential signal VGH.

Figure 1:
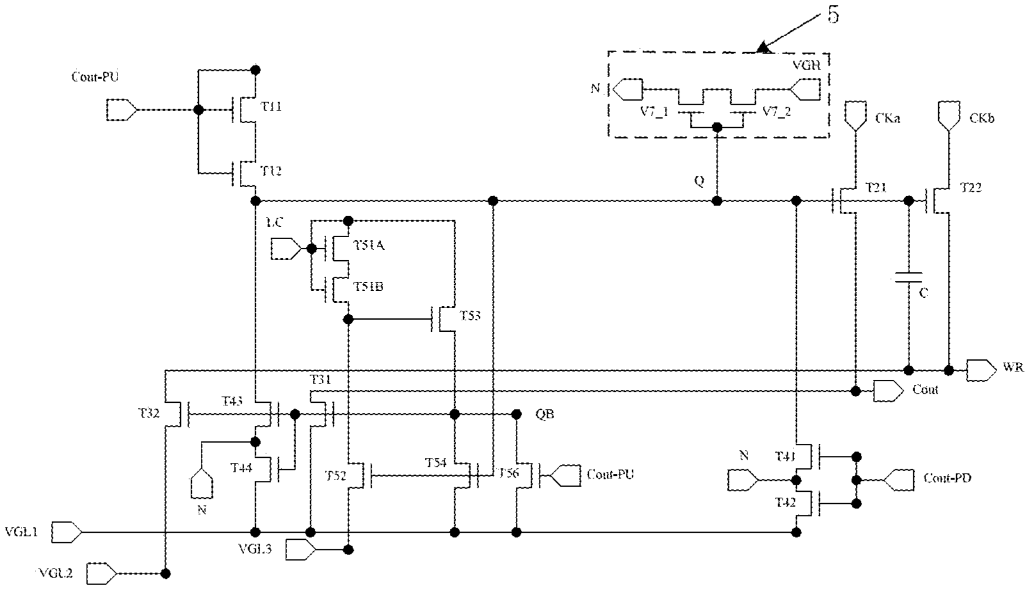
(PRIOR ART) Figure 1
FIG. 1 is a schematic circuit diagram of a GOA unit in a GOA circuit provided by the prior art.

In some embodiments, comparing FIG. 1 and FIG. 2, it can be seen that the embodiments of the present disclosure do not include the leakage-current prevention module 5 that was presented in the prior art.

It can be understood that, compared to the prior art, the embodiments of the present disclosure reduce the number of the leakage-current paths of the pull-up node Q, and there is no necessary to provide an additional leakage-current prevention module 5 to reduce the leakage current at the pull-up node Q, thereby simplifying the structure of the GOA circuit.

It should be noted that the leakage-current path of the pull-up node Q refers to thin-film transistors between the pull-up node Q and the first low-potential signal VGL1. As shown in FIG. 2, there are only three thin-film transistors disposed between the pull-up node Q and the first low-potential signal VGL1 in the embodiments of the present disclosure, specifically the seventh thin-film transistor T7, the eighth thin-film transistor T8, and the ninth thin-film transistor T9. As shown in FIG. 1, the prior art provides six thin-film transistors between the pull node Q and the first low-potential signal VGL1, specifically T41, T42, T43, T44, T11, and T12. Apparently, compared to the prior art, the embodiments of the present disclosure reduce the number of thin-film transistors on the leakage-current path of the pull-up node Q, thereby reducing the impact from the leakage-current at the pull-up node on the normal waveform outputs and avoiding the situation where the peak value of the output waveform is not high enough or even unable to be output.

The invention concept of the present disclosure is: by designing a new GOA circuit, the leakage current at the pull-up node Q is reduced. Specifically, by reducing the number of the leakage-current path between the first low-potential signal VGL1 and the pull-up node Q, it is beneficial for maintaining the high potential of the pull-up node Q, and in case that the high potential of the pull-up node Q is a necessary condition for realizing a normal waveform output, thereby reduces the impact of the leakage current at the pull-up node Q on the normal waveform output and avoids the situation where the peak value of the output waveform is not high enough or even unable to be output due to serious leakage current at the pull-up node Q.

The embodiments of the present disclosure also propose an array substrate, a display panel, a display module, and a terminal device. The array substrate, the display panel, the display module, and the terminal device include the above-mentioned GOA respectively, and will not to be elaborated further here. Herein, the display module also includes at least one of a backplane, a cover, an optical film, and a polarizer. The terminal device includes but is not limited to mobile phones, notebook computers, and tablet computers.

The GOA circuit according to one or more embodiments of the present disclosure includes a plurality of cascaded GOA units. Each of GOA units includes a pull-up module, an inverter module, a pull-down module, and an output module. The pull-up module includes a first thin-film transistor and a second thin-film transistor. A gate of the first thin-film transistor is connected to a pull-up signal. One terminal of the first thin-film transistor is connected to a pull-down node, and the other terminal of the first thin-film transistor is connected to a first low-potential signal. A gate of the second thin-film transistor is connected to a first node. One terminal of the second thin-film transistor is connected to a high-potential signal, and the other terminal of the second thin-film transistors is connected to the pull-down node. The inverter module includes a seventh thin-film transistor. A gate of the seventh thin-film transistor is connected to a second node. One terminal of the seventh thin-film transistor is connected to the high-potential signal, and the other terminal of the seventh thin-film transistor is connected to a pull-up node. The pull-down module includes an eighth thin-film transistor and a ninth thin-film transistor. A gate of the eighth thin-film transistor and a gate of the ninth thin-film transistor are respectively connected to the pull-down node. One terminal of the eighth thin-film transistor is connected to the first low-potential signal, the other terminal of the eighth thin-film transistor is connected to one terminal of the ninth thin-film transistor, and the other terminal of the ninth thin-film transistor is connected to the pull-up node. The gate of each thin-film transistor in the output module is connected to the pull-up node. Herein, in a pull-up stage, the first thin-film transistor is turned on, the second thin-film transistor is turned off, the seventh thin-film transistor is turned on, the eighth thin-film transistor and the ninth thin-film transistor are turned off, the pull-up node is connected to the high-potential signal, and the pull-down node is connected to the first low-potential signal. In a pull-down stage, the first thin-film transistor is turned off, the second thin-film transistor is turned on, the seventh thin-film transistor is turned off, the eighth thin-film transistor and the ninth thin-film transistor are turned on, the pull-down node is connected to the high-potential signal, and the pull-up node is connected to the first low-potential signal. The leakage-current path of the pull-up node of the GOA circuit is reduced to the seventh thin-film transistor, the eighth thin-film transistor, the ninth thin-film transistor. Compared to the GOA circuits in the prior art, the GOA circuit of the present disclosure has less leakage-current paths, thereby reducing the leakage current at the pull-up node, which helps maintain the high-potential of the pull-up node, avoid the abnormal output of waveform, and alleviate the technical problem of serious leakage current at the pull-up node in the GOA circuits in the prior art.

In the above embodiments, the descriptions for each embodiment focus on different aspects, and the aspects that are not detailed in a particular embodiment can be referred to the relevant descriptions in other embodiments.

The GOA circuit provided by the embodiments of the present disclosure has been introduced in detail. Specific examples are applied in the disclosure to illustrate the principles and implementation methods of the present disclosure. The description of the above embodiments is only for the purpose of helping understand the method and the core idea of the present disclosure. Furthermore, for the skilled person in the art, there could be changes in the specific implementation methods and application scope based on the ideas of the present disclosure. In summary, the content of this description should not be understood as a limitation on the present disclosure.

What is claimed is:

1. A GOA circuit, comprising a plurality of cascaded GOA units, wherein each GOA unit comprises:

a pull-up module comprising a first thin-film transistor and a second thin-film transistor, wherein a gate of the first thin-film transistor is connected to a pull-up signal, one terminal of the first thin-film transistor is connected to a pull-down node, the other terminal of the first thin-film transistor is connected to a first low-potential signal, a gate of the second thin-film transistor is connected to a first node, one terminal of the second thin-film transistor is directly connected to a high-potential signal, and the other terminal of the second thin-film transistor is directly connected to the pull-down node;

an inverter module comprising a seventh thin-film transistor, wherein a gate of the seventh thin-film transistor is connected to a second node, one terminal of the seventh thin-film transistor is directly connected to the high-potential signal, the other terminal of the seventh thin-film transistor is directly connected to a pull-up node;

a pull-down module comprising an eighth thin-film transistor and a ninth thin-film transistor, wherein a gate of the eighth thin-film transistor and a gate of the ninth thin-film transistor are respectively connected to the pull-down node, one terminal of the eighth thin-film transistor is connected to the first low-potential signal, the other terminal of the eighth thin-film transistor is connected to one terminal of the ninth thin-film transistor, and the other terminal of the ninth thin-film transistor is connected to the pull-up node; and an output module, wherein in the output module the gate of each thin-film transistor is connected to the pull-up node;

wherein, in a pull-up stage, the first thin-film transistor is turned on, the second thin-film transistor is turned off, so that the pull-down node is connected to the first low-potential signal, to cause the eighth thin-film transistor and the ninth thin-film transistor to be turned off, and in the pull-up stage, the seventh thin-film transistor is turned on, so that the high-potential signal is transmitted via the seventh thin-film transistor to the pull-up node; and in a pull-down stage, the first thin-film transistor is turned off, the second thin-film transistor is turned on, and the seventh thin-film transistor is turned off, so that the high-potential signal is transmitted via the second thin-film transistor to the pull-down node, to cause the eighth thin-film transistor and the ninth thin-film transistor to be turned on and cause the pull-up node to be connected to the first low-potential signal.

2. The GOA circuit of claim 1, wherein the pull-up module further comprises a third thin-film transistor and a fourth thin-film transistor, a gate of the third thin-film transistor is connected to the pull-up signal, one terminal of the third thin-film transistor is connected to the first node, the other terminal of the third thin-film transistor is connected to the first low-potential signal, a gate of the fourth thin-film transistor is connected to a pull-down signal, one terminal of the fourth thin-film transistor is connected to the high-potential signal, and the other terminal of the fourth thin-film transistor is connected to the first node.

3. The GOA circuit of claim 2, wherein the pull-up module further comprises a first capacitor, one terminal of the first capacitor is connected to the high-potential signal, and the other terminal of the first capacitor is connected to the first node.

4. The GOA circuit of claim 3, wherein the inverter module further comprises a fifth thin-film transistor and a sixth thin-film transistor, a gate of the fifth thin-film transistor is connected to the high-potential signal, one terminal of the fifth thin-film transistor is connected to the second node, the other terminal of the fifth thin-film transistor is connected to the high-potential signal, a gate of the sixth thin-film transistor is connected to the pull-down node, one terminal of the sixth thin-film transistor is connected to the first low-potential signal, and the other terminal of the sixth thin-film transistor is connected to the second node.

5. The GOA circuit of claim 4, wherein the pull-down module further comprises a tenth thin-film transistor and an eleventh thin-film transistor, a gate of the tenth thin-film transistor is connected to the pull-down node, one terminal of the tenth thin-film transistor is connected to a second low-potential signal, the other terminal of the tenth thin-film transistor is connected to an output terminal of a scan signal, a gate of the eleventh thin-film transistor is connected to the pull-down node, one terminal of the eleventh thin-film transistor is connected to the first low-potential signal, and the other terminal of the eleventh thin-film transistor is connected to an output terminal of a cascade transmission signal.

6. The GOA circuit of claim 5, wherein the output module comprises a twelfth thin-film transistor, a thirteenth thin-film transistor, and a second capacitor, a gate of the twelfth thin-film transistor is connected to the pull-up node, one terminal of the twelfth thin-film transistor is connected to the output terminal of the cascade transmission signal, the other terminal of the twelfth thin-film transistor is connected to a first pulse signal, a gate of the thirteenth thin-film transistor is connected to the pull-up node, one terminal of the thirteenth thin-film transistor is connected to the output terminal of the scan signal, the other terminal of the thirteenth thin-film transistor is connected to a second pulse signal, one terminal of the second capacitor is connected to the gate of the thirteenth thin-film transistor, and the other terminal of the second capacitor is connected to one terminal of the thirteenth thin-film transistor.

7. The GOA circuit of claim 6, wherein operating stages of the GOA circuit comprise a pull-up stage, an output stage, a pull-down stage, and a pull-down maintenance stage, wherein in the pull-up stage, the pull-up signal is at a high-potential, the pull-down signal is at a low-potential, the first thin-film transistor and the third thin-film transistor are turned on, the first node is connected to the first low-potential signal, the second thin-film transistor is turned off, the pull-down node is connected to the first low-potential signal, the sixth thin-film transistor is turned off, the second node is connected to the high-potential signal, the seventh thin-film transistor is turned on, and the pull-up node is connected to the high-potential signal.

8. The GOA circuit of claim 7, wherein in the output stage, the pull-up node is connected to the high-potential signal, the twelfth thin-film transistor and the thirteenth thin-film transistor are turned on, the twelfth thin-film transistor is connected to the first pulse signal and outputs the first pulse signal, the thirteenth thin-film transistor is connected to the second pulse signal and outputs the second pulse signal.

9. The GOA circuit of claim 8, wherein in the pull-down stage, the pull-down signal is at a high-potential, the pull-up signal is at a low-potential, the fourth thin-film transistor is turned on, the first node is connected to the high-potential signal, the second thin-film transistor is turned on, the pull-down node is connected to the high-potential signal, the sixth thin-film transistor is turned on, the seventh thin-film transistor is turned off, the eighth thin-film transistor, the ninth thin-film transistor, the tenth thin-film transistor, and the eleventh thin-film transistor are turned on, the pull-up node is connected to the first low-potential signal; in the pull-down maintenance stage, the pull-down signal is at a low-potential, the pull-up signal is at a low-potential, and the pull-down node maintains at a high potential.

10. A display panel, comprising a display panel, wherein the display panel comprises a GOA circuit comprising a plurality of cascaded GOA units, each GOA unit comprises:

a pull-up module comprising a first thin-film transistor, and a second thin-film transistor, wherein a gate of the first thin-film transistor is connected to a pull-up signal, one terminal of the first thin-film transistor is connected to a pull-down node, the other terminal of the first thin-film transistor is connected to a first low-potential signal, a gate of the second thin-film transistor is connected to a first node, one terminal of the second thin-film transistor is directly connected to a high-potential signal, and the other terminal of the second thin-film transistor is directly connected to the pull-down node;

an inverter module comprising a seventh thin-film transistor, wherein a gate of the seventh thin-film transistor is connected to a second node, one terminal of the seventh thin-film transistor is directly connected to the high-potential signal, the other terminal of the seventh thin-film transistor is directly connected to a pull-up node;

a pull-down module comprising an eighth thin-film transistor and a ninth thin-film transistor, wherein a gate of the eighth thin-film transistor and a gate of the ninth thin-film transistor are respectively connected to the pull-down node, one terminal of the eighth thin-film transistor is connected to the first low-potential signal, the other terminal of the eighth thin-film transistor is connected to one terminal of the ninth thin-film transistor, and the other terminal of the ninth thin-film transistor is connected to the pull-up node; and an output module, wherein in the output module the gate of each thin-film transistor is connected to the pull-up node;

wherein, in a pull-up stage, the first thin-film transistor is turned on, the second thin-film transistor is turned off, so that the pull-down node is connected to the first low-potential signal, to cause the eighth thin-film transistor and the ninth thin-film transistor to be turned off, and in the pull-up stage, the seventh thin-film transistor is turned on, so that the high-potential signal is transmitted via the seventh thin-film transistor to the pull-up node; and in a pull-down stage, the first thin-film transistor is turned off, the second thin-film transistor is turned on, and the seventh thin-film transistor is turned off, so that the high-potential signal is transmitted via the second thin-film transistor to the pull-down node, to cause the eighth thin-film transistor and the ninth thin-film transistor to be turned on and cause the pull-up node to be connected to the first low-potential signal.

* * * * *